US012399981B2

(12) United States Patent
Malik et al.

(10) Patent No.: US 12,399,981 B2
(45) Date of Patent: Aug. 26, 2025

(54) COMPUTER DEVICE AND METHOD FOR SELECTIVE CONTENT ISOLATION

(71) Applicant: Microsoft Technology Licensing, LLC, Redmond, WA (US)

(72) Inventors: Vikas Malik, Bothell, WA (US); Nir Mardiks Rappaport, Bellevue, WA (US); Vinay Kumar Shiva, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 162 days.

(21) Appl. No.: 18/069,615

(22) Filed: Dec. 21, 2022

(65) Prior Publication Data

US 2024/0211587 A1 Jun. 27, 2024

(51) Int. Cl.
*G06F 21/53* (2013.01)
*G06F 9/455* (2018.01)
*G06F 9/54* (2006.01)

(52) U.S. Cl.
CPC .......... *G06F 21/53* (2013.01); *G06F 9/45558* (2013.01); *G06F 9/545* (2013.01); *G06F 2009/45587* (2013.01); *G06F 2221/033* (2013.01)

(58) Field of Classification Search
CPC .................. G06F 21/53; G06F 9/45558; G06F 2009/45566; G06F 9/468; G06F 9/545
See application file for complete search history.

(56) References Cited

U.S. PATENT DOCUMENTS

| | | | | |
|---|---|---|---|---|
| 9,477,520 | B2 * | 10/2016 | Fitzgerald | G06F 21/53 |
| 9,852,001 | B2 * | 12/2017 | Fitzgerald | G06F 9/45558 |
| 10,353,724 | B2 * | 7/2019 | Fitzgerald | G06F 9/45558 |
| 11,025,513 | B2 * | 6/2021 | Guan | H04L 41/0895 |
| 11,245,731 | B1 | 2/2022 | Guruswamy | |
| 11,341,208 | B2 * | 5/2022 | Reddy Vennapusa | H04W 12/084 |
| 11,762,978 | B1 * | 9/2023 | Chintala | G06F 21/53 |

(Continued)

OTHER PUBLICATIONS

"Browser Isolation: An In-Depth Look", Retrieved From: https://perception-point.io/browser-isolation-an-in-depth-look/, Retrieved on Aug. 2, 2022, 7 Pages.

(Continued)

*Primary Examiner* — Hosuk Song
(74) *Attorney, Agent, or Firm* — Weaver IP L.L.C.

(57) ABSTRACT

In one or more examples, a network proxy agent runs inside an isolated (e.g. sandboxed or virtualized) execution environment and a non-isolated application (e.g., web browser) instance runs outside of the isolated execution environment. The network proxy agent acts as a proxy in the sense that network traffic to and from the application instance is routed through the network proxy agent, and thus via the isolated execution environment. A content access policy is supplied to the content access policy agent, and the content access policy agent enforces the content access policy inside the isolated execution environment in relation to the network traffic. For example, content from a certain resource may be restricted according to the content access policy, in which case content requested from that resource is contained within the isolated environment, and replacement content is served to the non-isolated application instance instead.

20 Claims, 4 Drawing Sheets

(56) References Cited

U.S. PATENT DOCUMENTS

| | | | |
|---|---|---|---|
| 11,829,368 B2* | 11/2023 | Colcord | G06F 21/6227 |
| 11,928,231 B2* | 3/2024 | Levy | H04L 63/205 |
| 11,934,893 B2* | 3/2024 | Pab?n | G06F 16/122 |
| 11,995,205 B2* | 5/2024 | Levy | H04L 63/083 |
| 12,015,613 B2* | 6/2024 | Sienicki | H04L 63/062 |
| 2018/0159896 A1 | 6/2018 | Soman | |
| 2022/0385671 A1 | 12/2022 | Silverstein | |

OTHER PUBLICATIONS

"Cloud Browser Isolation", Retrieved From: https://web.archive.org/web/20221107164754/http://www.zscaler.com/technology/browser-isolation, Nov. 7, 2022, 6 Pages.

"How to Capture a Browser Page Rendering from Client-side?", Retrieved From: https://web.archive.org/web/20130525153859/https://stackoverflow.com/questions/1266568/how-to-capture-a-browser-page-rendering-from-client-side, May 25, 2013, 2 Pages.

"Remote Browser Isolation (RBI): An In-Depth Look", Retrieved From: https://web.archive.org/web/20210512052735/https://www.hysolate.com/learn/virtual-browser/remote-browser-isolation-rbi-an-in-depth-look/, May 12, 2021, 7 Pages.

Miller, Daniel, "Virtual Browsers vs Remote Browser Isolation: Which Secure Browsing Solution is Right for Your Organization", Retrieved From: https://blog.ericom.com/virtual-browser-vs-remote-browser-isolation/, Dec. 27, 2018, 6 Pages.

"What is Browser Isolation?", Retrieved From: https://web.archive.org/web/20220525204012/https://www.proofpoint.com/us/threat-reference/browser-isolation, May 25, 2022, 7 Pages.

"What is browser Isolation?", Retrieved from: https://web.archive.org/web/20221203085116/https://www.cloudflare.com/learning/access-management/what-is-browser-isolation/, Dec. 3, 2022, 9 Pages.

Bhargava, Ayushi, "What is Browser Isolation? (Definition, Types, and Usage)", Retrieved from: https://www.tutorialspoint.com/what-is-browser-isolation-definition-types-and-usage#, Apr. 14, 2022, 3 Pages.

Barr, et al., "Microsoft Edge Support for Microsoft Defender Application Guard", Retrieved From: https://learn.microsoft.com/en-us/deployedge/microsoft-edge-security-windows-defender-application-guard, Sep. 1, 2022, 992 Pages.

Jones, Caitlin, "The Top Browser Isolation Solutions for Business", Retrieved From: https://expertinsights.com/insights/the-top-browser-isolation-solutions-for-business/, Nov. 24, 2022, 13 Pages.

Lightfoot, Lottie, "What is Remote Browser Isolation and How Does It Work?", Retrieved From: https://expertinsights.com/insights/remote-browser-isolation-what-how-work/, Nov. 24, 2022, 7 Pages.

Msft, et al., "Microsoft Defender Application Guard Overview", Retrieved From: https://learn.microsoft.com/en-us/windows/security/threat-protection/microsoft-defender-application-guard/md-app-guard-overview#what-is-application-guard-and-how-does-it-work, Nov. 3, 2022, 3 Pages.

International Search Report and Written Opinion received for PCT Application No. PCT/US23/081463, Apr. 4, 2024, 14 pages.

International Preliminary Report on Patentability (Chapter 1) received for PCT Application No. PCT/US23/081463, mailed on Jul. 3, 2025, 8 pages.

* cited by examiner

COMPUTER DEVICE AND METHOD FOR SELECTIVE CONTENT ISOLATION

TECHNICAL FIELD

The present disclosure pertains to a form of content isolation technology that allows content (such as web content) to be requested and rendered in a securely manner.

BACKGROUND

When it comes to device security, there is often a trade-off between, on the one hand, user experience (facets such as useability, convenience, productivity and feature richness) and, on the other hand, security. Web browsing is one example of a context in which such trade-offs may arise. Modern web protocols, such as HTML 5.0, and browsers supporting such protocols have the ability to deliver an increasingly rich web browsing experience, greatly expanding capabilities of modern browsers beyond basic rendering of 'traditional' HTML content, e.g. through the use of script (e.g., JavaScript) within web content. For example, modern web browsers are able to support rich application features, such as document editing, file storage and sharing, and collaboration features, all within a browser that would have traditionally required their own dedicated applications. Further expanded capabilities may be provided through the use of browser extensions, add-ons and the like. Such feature richness is desirable from a user experience perspective. Indeed, the prevalence of such features has raised user expectations, with many users taking the availability of such features for granted. On the other hand, from a security perspective, there is a significant risk attached to such expanded capabilities. As the 'reach' of web browsers increases, not only may new vulnerabilities be exposed, but those vulnerabilities may be more prone to exploitation (by malicious software and the like) in a way that causes significant and widespread damage to the host machine or its operating system, which in turn may be hard or impossible to contain. For example, an attacker might be able to exploit a vulnerability to obtain 'Remote Code Execution' (RCE), allowing the attacker to run native code (e.g., CPU code or other machine code) on the host machine, escaping the limitations of web code (such as HTML, CSS and JavaScript).

SUMMARY

In one or more examples, a network proxy agent runs inside an isolated (e.g. sandboxed or virtualized) execution environment and a non-isolated application (e.g., web browser) instance runs outside of the isolated execution environment. The network proxy agent acts as a proxy in the sense that network traffic to and from the application instance is routed through the network proxy agent, and thus via the isolated execution environment. A content access policy is supplied to the content access policy agent, and the content access policy agent enforces the content access policy inside the isolated execution environment in relation to the network traffic. For example, content from a certain resource may be restricted according to the content access policy, in which case content requested from that resource is contained within the isolated environment, and replacement content (such as an image of the requested content rendered within the isolated environment) is served to the non-isolated application instance instead. In some examples, content from some other resource is not restricted according to the content access policy, and is therefore relayed to the application instance in its requested form.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF FIGURES

Embodiments will now be described, by way of example only, with reference to the following schematic figures, in which.

DETAILED DESCRIPTION

Figure 1:
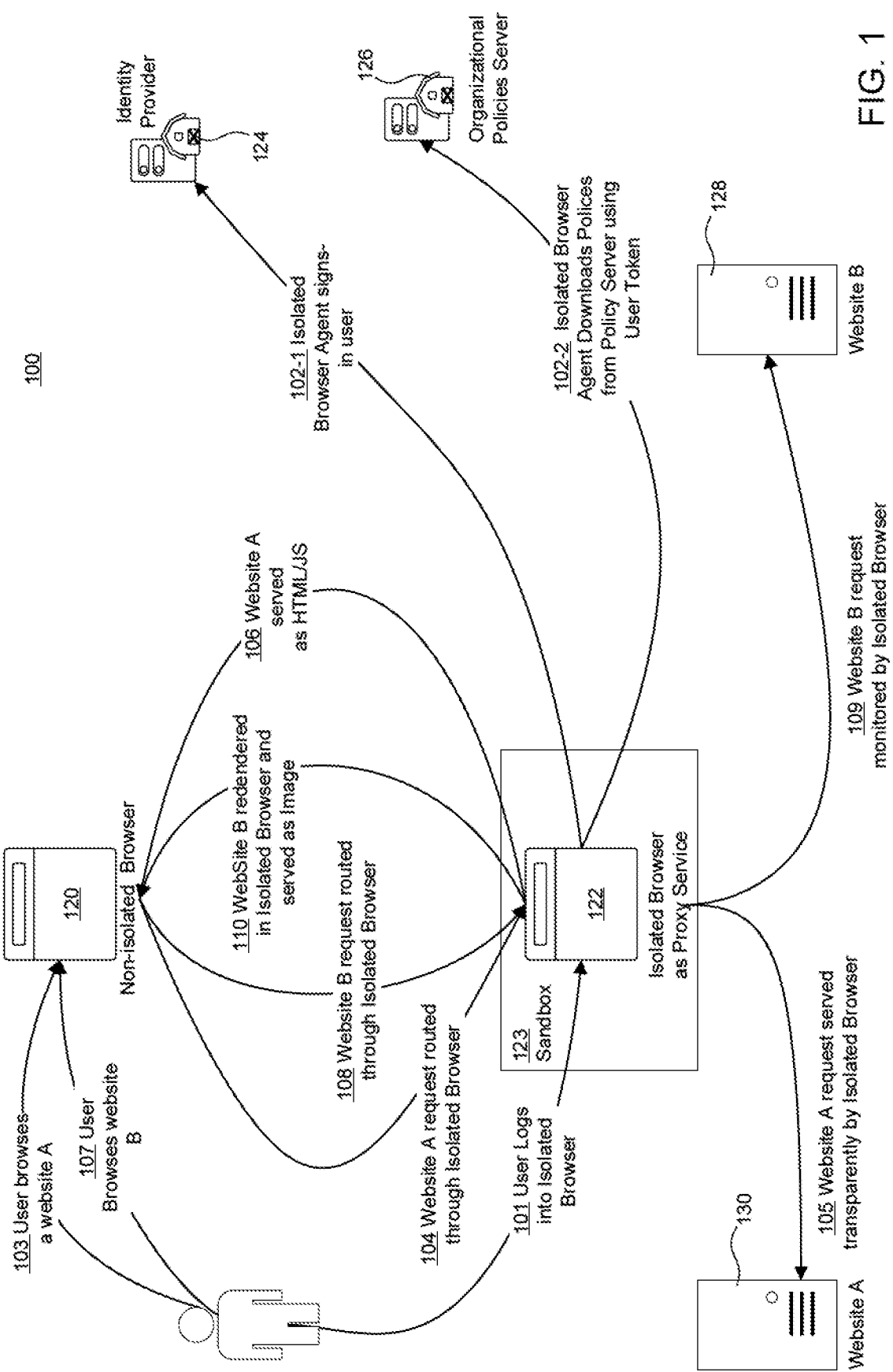
FIG. 1 shows a schematic block diagram of a computer system and an example signalling flow within the computer system.

Certain modern web browsers are equipped with an 'isolation' function that allows the browser to be instantiated on a host machine within an isolated sandbox environment. A browser instance runs within the sandbox, isolated from the rest of the host machine. Thus, if the browser is compromised, any damage is contained within the sandbox, and the contents of the sandbox be completely destroyed by terminating the sandbox. Whilst this is beneficial from a security perspective, it can also be detrimental to the user experience. For example, only certain browsers offer such isolation functions, which in turn restricts the user's choice of browser. The functionality of a sandboxed browser may also be limited in some cases, which may be necessary to maintain the security of the sandbox.

Browser sandboxing can be used in combination with a content access policy. For example, a device managed by an organization may be required to download and install a content access policy from a policy server. The content access policy can, in turn, restrict access to e.g., certain websites, domains or other web resources, and the restrictions may be tailored to different browser contexts. For example, a first policy rule set (one or more first policy rules) may be imposed on first browser instance that is non-isolated and a second policy ruleset (one or more second policy rules)—that is less restrictive in some sense—may be imposed on a second browser instance that is isolated (sandboxed). The first and second browser instances could be instances of the same browser (outside of and inside the sandbox respectively), or instances of different browsers. Whilst this approach provides a degree of flexibility (e.g., in that a user is free to use their preferred non-secure browser within the boundaries of the first set of restrictions), it is not ideal from a useability perspective. For example, if the user attempts to use the first browser instance to access a website that is blocked under the first policy ruleset, the burden is then on the user to manually switch to the second browser instance, and attempt to access the website for a second time (which may or may not be permitted under the second policy ruleset applicable to the sandboxed browser context).

An element of automation could also be introduced into the process flow described above. For example, a decision engine running on the user's machine could be configured to detect when the user attempts to access a website from the first browser instance that is blocked under the first policy ruleset, but permitted under the second policy ruleset, and automatically switch to the second browser instance in response. This somewhat reduces the burden on the user, but still provides a sub-optimal user experience because of the requirement to switch between browser contexts.

Another approach is browser isolation, a technology that keeps browsing activity secure by separating the process of loading webpages from the user devices displaying the webpages. This way, potentially malicious webpage code does not run on a user's device, preventing malware infections and other cyber-attacks from impacting both user devices and internal networks. For example, a web page may be rendered on a remote server, and an image of the web page may be transmitted to the user's device, in place of the original website content. Whilst browser isolation has clear security benefits, it provides a more limited user experience, which may be unnecessarily restrictive if 'blanket' isolation is applied to all browsing activity (including browsing activity known to be reasonably safe).

Among other things, browser isolation can be used to avoid confidential or malicious data from downloaded on the user's machine, block copy-paste of sensitive data, block malicious scripts' ability to run on the user's machine and access the user's data, block malicious web content without having to block entire websites, and/or provide monitoring and auditing by logging the interaction of users with confidential or dangerous websites.

In the example embodiments described below, a network proxy agent runs inside a sandbox and an insecure application (e.g., browser) runs outside of the sandbox. The network proxy agent acts as a proxy in the sense that all network traffic to and from the non-isolated application is routed though the network proxy agent, and thus via the sandbox. Whilst the following examples refer to sandboxing, the description applies equally to other isolation mechanisms (such as virtualization, in which case a network proxy agent may be instantiated on a virtual machine, which in turn is executed on a physical processor).

In contrast to blanket browser isolation applied to all network traffic, the network proxy agent implements a form of selective browser isolation, governed by a content access policy enforced by the agent itself within the sandbox. The network proxy agent includes decision logic, enabling it to make decisions, in accordance with the content access policy, as to whether or not to implement browser isolation in a given situation.

The network proxy agent acts as a proxy in the sense that all network traffic to and from the non-isolated browser is routed though the network proxy agent, and thus via the sandbox. Although the content access policy is enforced inside the sandbox, the content access policy defines both circumstances in which content is permitted to be rendered outside of the sandbox and circumstances in which content is only permitted to be rendered within the sandbox. In the former, the content access policy agent acts as a transparent proxy, relaying requests from the non-isolated browser instance to their intended destination services, and passing content returned by those serviced to the application unaltered; that content is, in turn, rendered by the non-isolated application outside of the sandbox. In the latter, requests from the non-isolated browser instance are similarly relayed to their intended destination services, but the content returned by those services is not passed to the non-isolated application and does not leave the sandbox in its original form. Instead, the retrieved content is used to generate a more limited representation of content within the sandbox (such as an image of the requested content as rendered inside the sandbox), and only the limited content is passed to the non-isolated application instance.

One embodiment uses client-side selective browser isolation to isolate traffic to and from website with sensitive, confidential, or malicious content and apply session control by integrating it with an identity provider and organizational policy server managed by organizational administrators. With client-side browser isolation, webpages are still loaded on the user device, but a local isolation mechanism, such virtualization or sandboxing, is used to keep website code and content separate from the rest of the device, to the extent required by the content access policy. Implementing the isolation client-side can significantly reduce latency caused by the proxying of network traffic though the agent.

Another embodiment uses remote browser isolation, in which a remote proxy server provides an execution environment that is isolated from the user device by virtue of being remote from the user device. In this case, the content access policy is enforced at the remote proxy server.

Selective browser isolation improves the functioning of a computing device on which a browser instance is executed, by providing a more optimal trade-off between useability and security. When browser isolation is applied, there may be some impact on the user experience (although the user is not required to switch to a different browser, the browsing experience may nevertheless be somewhat different than 'normal' browsing). When browser isolation is deemed unnecessary according to the content access policy, e.g. because a particular requested resource is highly trusted, there is no impact on the user experience (because the requested content is delivered unaltered to their preferred browser), without compromising security. With a client-side implementation, the functioning of the computer device is further improved through reduced latency, particularly in periods when browser isolation is engaged.

FIG. 1 shows a schematic block diagram of a computer system 100 and an example signalling flow within the content rendering system 100. The computer system 100 is shown to comprise a non-isolated application, in the form of a first (non-isolated) browser instance 120 in this example, and a network proxy agent 122, which is implemented in this example as a second (isolated) browser instance in a proxy service configuration.

The network proxy agent 122 is sandboxed, that is, it runs within a sandbox 123 on a host machine. The sandbox 123 is a secure 'wrapper' that provides a tightly controlled set of resources (such as memory, storage resources and/or network resources). An application running within the sandbox 123 is restricted to the resources controlled by the sandbox 123. Therefore, if the application is malicious or compromised, any resulting damage is limited to those contained resources. In this manner, any application running within the sandbox 123 is isolated within the sandbox 123, and does not pose a risk to the host machine or its operating system. Access to host machine resources can be similarly restricted using other isolation mechanisms, such as virtualization or hardware isolation. An isolated execution environment means a software system or hardware system implemented on or in a processor of a device that tightly controls execution of an application executed on the processor (an application executed under the control of such a system said to run within the isolated execution environment). The isolated execution environment restricts access by the application to a predefined subset of device resources. The application is prevented from accessing other device or system resources (that would normally be available to trusted applications executed outside of the isolated execution environment), such as a file system or network resource available to the device. Therefore, any damage caused by a malicious or compromised application is limited to the predefined subset of device resources (and is said to be contained within the isolated execution environment), from which it can be easily purged (whereas, outside of the isolated execution environment, such damage has the potential to spread in an uncontrolled manner, e.g. to the operating system of the device or to second device via a network connecting the device and the second device). A sandbox isolates an application by restrings permissions of the application to a tightly controlled set of resources. A sandbox may be implemented in the operating system of within a 'parent' application (e.g., a browser application with a built-in sandbox to run a JavaScript application). A virtual machine is implemented using software (such as a hypervisor) that enables a second operating system to run on a first ('host') operating system, and restricts operations (such as file or network operations) between the host operating system and the second operating system. One example hardware isolation is a secure enclave within a processor (such as a secure region of processor memory). Communication between the secure enclave and other part(s) of the processor (e.g. another region of processor memory) is restricted using cryptographic methods, preventing an application running within the secure enclave from propagating damage outside of the secure enclave.

In the example of FIG. 1, the non-isolated browser instance 120 is non-isolated in that is does not run within the sandbox 123. On the one hand, this means that, if the non-isolated browser instance 120 were to be compromised, there is no guarantee the resulting damage could be contained. On the other hand, because the non-isolated browser instance 120 runs in a 'normal' execution environment, it is able to provide a more user-friendly browsing experience.

The non-isolated browser instance 120 runs on a user device operated by a user. In one embodiment, the network proxy agent 122 also runs on the user device, and acts as a local proxy. In another embodiment, the network proxy agent 122 runs on a proxy server remote from the user device.

The network proxy agent 122 acts as a proxy, in that network traffic exchanged between the non-isolated browser instance 120 and a computer network (not shown) is routed via the isolated browser instance.

The computer system 100 is also shown to comprise an identity provider service 124 and a policy service 126, which are used by the network proxy agent 122 to obtain a content access policy that it applied to the network traffic routed through it.

Although the content access policy is enforced inside of the sandbox 123, the content access policy contains rule(s) pertaining not only to the rendering of content within the sandbox 123, but also rule(s) pertaining to the rendering of content outside of the sandbox 123 within the non-isolated browser 120. For example, a certain website(s), domain(s) or other resource may have a 'restricted' status in the content access policy. As another example, certain resource types may be restricted in the content access policy. Content from resources that are restricted by the content access policy is not blocked altogether, but is only permitted to be rendered within the sandbox 123 (not outside of it), and therefore cannot be served content directly to the non-isolated browser 120. In place of the full content, a more limited representation of the content is served to the non-isolated browser 120 (a process referred to herein as 'sanitizing' the restricted content).

One example of content sanitization is generating an image of the rendered content, served in place of the original restricted content (e.g., HTML and/or JavaScript, or other web content) that does not leave the sandbox 123. Note, this does not require any action on the part of the user, nor does it require the user to switch (whether manually or automatically) to an isolated browser context. The user can continue to use their preferred browser setup, outside of the sandbox 123, and can do so safely because all restricted content is sanitized within the sandbox 123 before reaching the user's preferred browser.

Other content may have an 'unrestricted' status in the content access policy, for example because it is associated with a trusted website, domain or other content resource having an unrestricted status. Unrestricted content is relayed transparently to the non-isolated browser 120, without processing or modification in the sandbox, where it can be rendered in the normal way.

For example, a video stream of the rendered content generating using a 'screen capture' or 'remote desktop' mechanism. With a video stream, the user is presented with an image of the content rendered in the sandbox, but the underlying content (e.g., HTML and JavaScript elements) never leaves the sandbox. The user can still interact with the video stream, for example by selecting a location or region within the image. In that event, the non-isolated application relays the user interactions back to the network proxy agent in the sandbox, which in turn implements those interactions in respect of the original content. For example, if use user selects a location in the image at which a hyperlink is visible, the image coordinates are passed back to the agent. The agent can, in turn, map these image coordinates to the hyperlink in the original content rendered in the sandbox, and select the hyperlink within the original content (all within the safety of the sandbox).

Alternatively, a static image (e.g., pixel or vector graphic) of the rendered web page may be provided to the non-isolated browser 122.

If a resource is unrestricted, however, content received from that resource is not rendered or monitored in the sandbox; it is simply passed to the non-isolated application instance.

Another example of sanitization is modifying content that contains script, e.g., to remove some or all of the script, before the modified content is passed to the non-isolated browser for rendering. This form of sanitation does not require the content to be rendered in the sandbox 123. The decision as to whether or not to remove some or all of the script (or otherwise modify the content) depends on whether the resource is restricted or unrestricted. If the resource is unrestricted, no script is removed (and the agent does not attempt to modify the content in any other way), and the agent does not monitor content obtained from unrestricted resources. A content modification process is only applied in the sandbox to content contained obtained from restricted resources.

When a request intended pertaining to a content resource is received at the isolated browser 122 from the non-isolated browser 120 (as part of the network traffic routed through the isolated browser 122), the isolated browser inspects the request, in order to assign the content resource a status according to the rule(s) of the content access policy. If the request is unrestricted, it is proxied to its intended destination, and the content returned in response is passed to the non-isolated browser instance 120 unaltered. If the request is assigned a restricted status, the content is requested in the same way, but the content is then sanitized in the above sense.

In some implementations, certain resources may be blocked altogether (e.g., download requests, or download requests associated with a particular entity). In contrast to restricted content that is served in a sanitized form, a blocked request simply returns a predetermined error output.

A status may be defined implicitly in the content access policy. For example, the content access policy may include a 'whitelist' of unrestricted resources or resource types (and possibly a 'blacklist' of blocked resources or resource types), with any content outside of these definitions being restricted by default. As another example, the content access policy might include a 'red list' of restricted resources or resource types (and possibly a blacklist of blocked resources or resource types), with any content outside of these definitions being restricted by default.

In one example use case, a network proxy agent (such as the isolated browser 122 acting as a proxy) is used to enforce organizational policies for web access. The network proxy agent is bootstrapped with organizational policies when a user authenticated themselves with the network proxy agent.

Based on the organizational policies, the network proxy agent can, for example, take one of the following actions: (i) bypass an unrestricted website or resource, in which case the user browses and interacts with such websites directly (unrestricted content); (ii) block a website or resource (the user is prevented from accessing such websites at all); or (iii) monitor and apply session control on a restricted website or resource, in which case the website is rendered in the network proxy agent, with only limited content (such as images served) to the non-isolated browser 120.

This approach allows the user to work on their preferred browser, because the network agent is used as a proxy.

Moreover, because the network agent works as a proxy, more granular session policy can be applied. For example, the policy might block file downloads from only from certain folders within a web-based file sharing service, only block downloads of files classified as confidential, or only block download of files containing personal data e.g., identification elements (such as passport or identity card details), bank details etc.

In the example flow described below, the network proxy agent works as proxy service such that all network traffic flowing to and from the user's devices goes through it.

At step 101, a user provides a credential(s) that may be used to verify their identity with an organization to which the user belongs.

At step 102-1, the user is authenticated with the identity provider service 124 using the credential(s). The identity server 124 verifies the user's identity, which in turn is associated with the organization that sets an organizational content access policy applicable to the user. The identity service 124 returns an authentication token once the user has been successfully authenticated.

At step 102-2, using the authentication token, the network proxy agent 122 downloads the organizational content access policy from the policy service 126, which may be hosted with the identify service 124 or on a separate server.

The network proxy agent 122 enforces access and session control on the network traffic routed through it based on the organizational content access policy. The organizational content access policy is managed by an organization administrator.

At step 103, the user browses a first website (website A) using the non-isolated browser instance 120.

At Step 104, a first request to website A is routed though the network proxy agent 122. The network proxy agent 122 inspects the first request, and in so doing determines that content monitoring and sanitization is not required for website A according to the content access policy, nor is the request blocked. Accordingly, the first request is assigned an unrestricted status.

At step 105, based on the unrestricted status of the first request, the network proxy agent 122 forwards the first request to a first web server 130 hosting website A. The network proxy agent 122 receives a first response from the first web server 130, containing first web content requested by the user.

At step 106, because the first request has been assigned an unrestricted status, the first web content is served to the non-isolated browser 120 without modification, e.g., containing HTML, JavaScript and/or CSS elements as returned by the first web server 130 at step 105.

At step 107, the user browses a second website (website B) using the non-isolated browser 120.

At step 108, a second request to website B is routed through the network proxy agent 122. The network proxy agent 122 inspects the second request, and in so doing determines that website B is required to be monitored and have its content sanitized according to the content access policy.

At step 109, the network proxy agent 122 forwards the second request to a second web server 128 hosting website B.

At step 110, a second response is received by the network proxy agent 122 from the second web server 128, containing second web content (e.g., second HTML, JavaScript and/or CSS elements).

However, because the second request has been assigned a restricted status, the second content is not passed to the non-isolated browser in the form received from the second web server 128. Instead, in this example, the second web content is rendered by the network proxy agent 122 inside the sandbox 123. The result is a rendered page within the sandbox 123, and an image of the rendered page is served to the non-isolated browser 120. Any user input received on the image is passed from the non-isolated browser 120 to the network proxy agent 122, and processed by the agent accordingly. When the user selects a location with the image associated with a corresponding action defined in the second web content (e.g., selecting a hyperlink rendered at the selected location in the image), the network proxy agent 122 performs the corresponding action within the sandbox 123. This could, for example, result in a third request, with further content that is returned in response to the third request being similarly rendered within the sandbox 123.

Based on the organizational content access policy, the network proxy agent 122 could also block a website or other resource, in which case a simple error page may be returned by the network proxy agent 122 to the non-isolated browser 120 showing blocked access.

Figure 2:
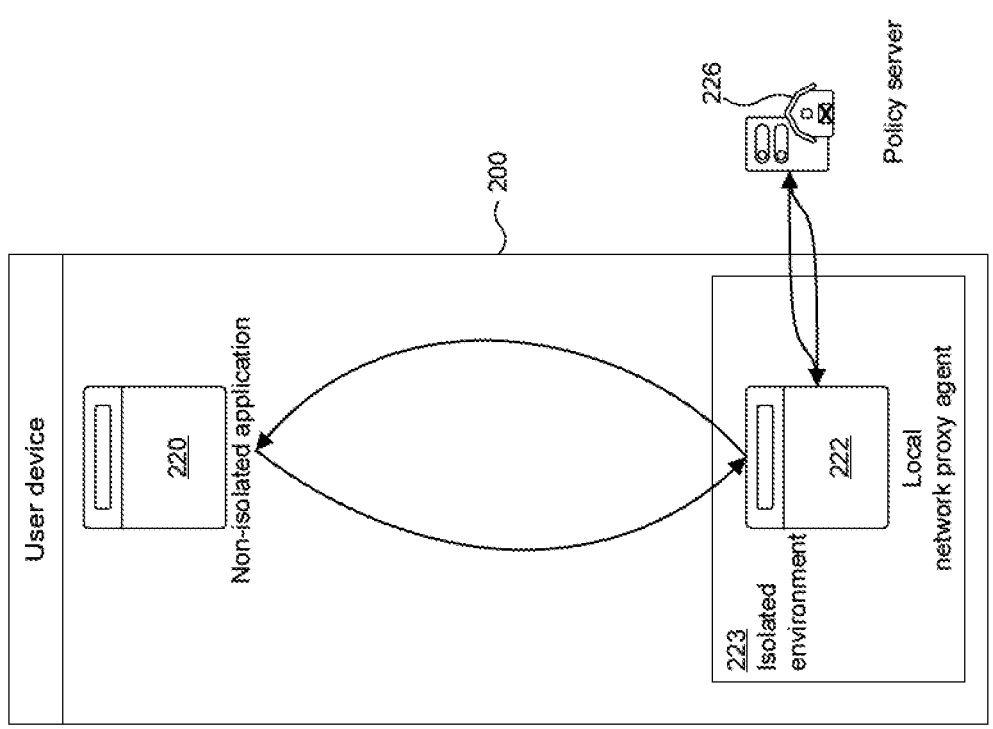
FIG. 2 shows a first example deployment scenario.

FIG. 2 shows a first example deployment scenario, in which a non-isolated application instance 220 (e.g., the non-isolated browser instance 120) and a local network proxy agent 222 (e.g., the proxy agent 122) are executed on a user device 200. The local network proxy agent 122 runs within an isolated execution environment 223, such as a virtual machine or sandbox (e.g., the sandbox 123), on the same device as the non-isolated application instance 220 that runs outside of the isolated execution environment 223. If the isolated execution environment 223 is compromised by content obtained from a restricted resource, any damage is contained within the isolated execution environment 223, which can be easily terminated in that event (which purges its contents). The local network proxy agent 222 obtains a content access policy from a policy server 226, and uses the content access policy to implement selective browser isolation on the user device 200. Virtual machines and sandboxes are examples of software-based isolated execution environment, where resource access is restricted in software. An isolated execution environment could also be implemented based on hardware isolation, e.g. using physically isolated circuitry.

Figure 3:
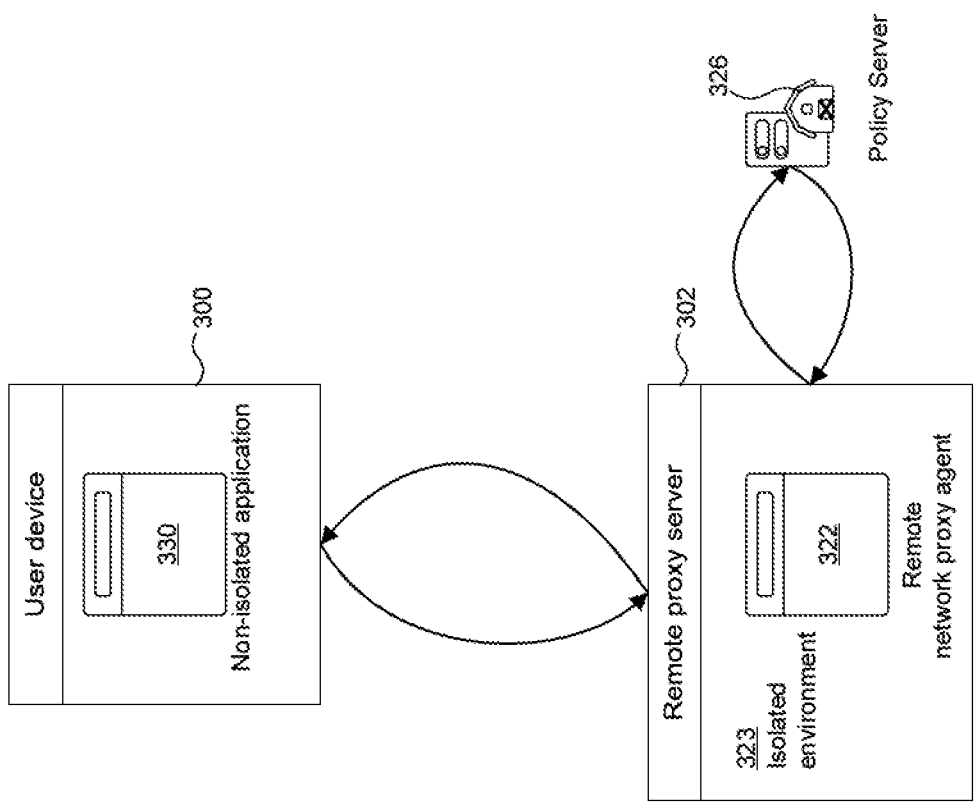
FIG. 3 shows a second example deployment scenario.

FIG. 3 shows a second example deployment scenario, in which a non-isolated application instance 320 (e.g., the non-isolated browser instance 120) and a remote network proxy agent 322 (e.g., the proxy agent 122) are executed on a user device 300 and a remote proxy server 302 respectively. The remote network proxy agent 122 runs within an isolated execution environment 323, such as a virtual machine or sandbox (e.g., the sandbox 123), but remotely from the user device 300. If the isolated execution environment 323 on the remote proxy server 302 is compromised by content obtained from a restricted resource, any damage is contained within the isolated execution environment 223, which can be easily terminated in that event (purging its contents), without impacting the rest of the server 302. Content that is transparently relayed to the user device 300 is not rendered or executed in the remote proxy server 302, and therefore poses no risk to it (in any event, content is only handled in this way in respect of trusted content resources). The remote network proxy agent 322 obtains a content access policy from a policy server 326, and uses the content access policy to implement selective browser isolation at the remote proxy server 302.

Figure 4:
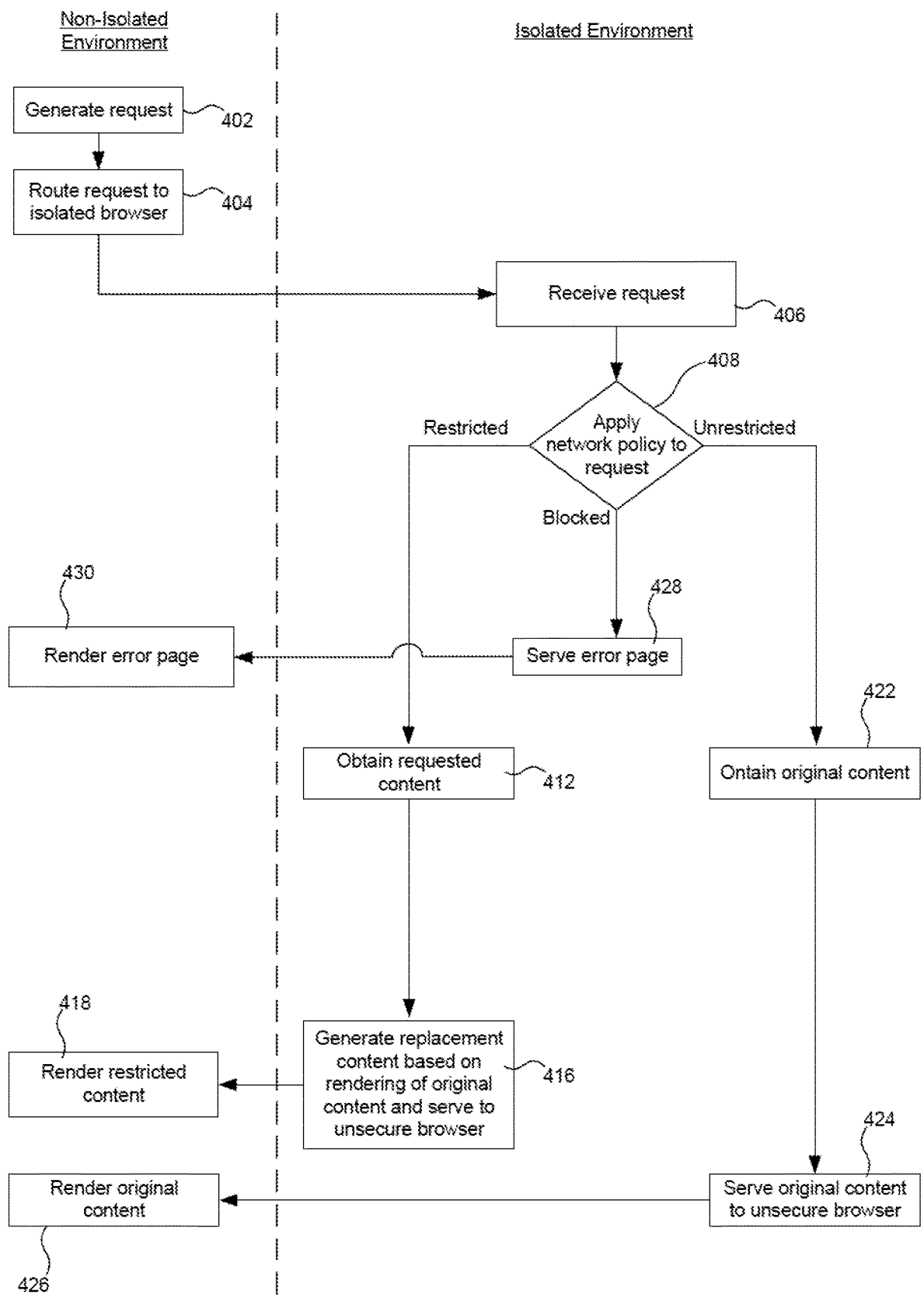
FIG. 4 shows a flowchart for a method of selective content isolation.

FIG. 4 shows a flow chart for a method of processing a content request.

At step 402, a content request is generated by an application instance in a non-isolated environment.

At step 404, the content request is routed to a network proxy agent running in an isolated execution environment.

At step 406, the content request is received by the network proxy agent.

At step 408, the network proxy agent applies a content access policy to the content request The content request identifies at least one content resource from which content is being requested, such as a web resource identified by a uniform resource indicator or other resource identifier. The network proxy agent assigns a restriction status to the content resource, reflecting a level of trust in the resource.

The content access policy allows different levels of restrictions (e.g., unrestricted, restricted or blocked to be assigned to resources, reflecting the extent to which they are trusted. Restriction statuses may be assigned to resources in the content access policy at any desired level of granularity. For example, a resource may be associated with a (top-level) domain, and the content access policy may include restrictions defined at the domain level. In that case, the network proxy agent may assign a resource a restricted, unrestricted or blocked status based on a corresponding status assigned to its domain in the network policy. Alternatively or additionally, restrictions can be defined in the content access policy in a more granular fashion, e.g., such that different resources associated with the same domain may be assigned different restriction statuses.

Within restricted session, a more fine-grained session policy can additionally be applied, e.g., to block copy-paste operations, or to block downloads based on content inspection (e.g., block a file determined to contain credit card details). A session policy may be applied based on inspection of a request (e.g. HTTP or HTTPS request) URI/URL, a header, and/or body; and or based on inspection of a response (e.g. HTTP or HTTPS response) header or body. When the application instance requests some operation (e.g. a copy and paste operation, or a download operation etc.) pertaining to some content contained within the isolated execution environment, the network proxy agent determines whether the operation is permitted under the session policy, and performs or rejects the operation accordingly.

Metadata about a resource, such as a domain name or resource identifier, or a type of the resource, is used, in some implementations, to enforce the content access policy.

The method branches at step 408 depending on the restriction status. The following examples consider three possible restriction statuses: restricted, unrestricted and blocked.

If the content resource is assigned a restricted status at step 408, the method proceeds to step 412.

At step 412, the content request is used to obtain the requested content. Step 412 typically involves at least one request-response exchange with a web server or other content server. Embedded content, such as iframes, can be handled in various ways. In one implementation, each iframes is treated separately (e.g. to determine whether to block, restrict or allow unrestricted access to each iframe separately, in accordance with the access policy). In another implementation, a parent policy or 'most restrictive' policy is applied to all iframes. In some embodiments, multiple options may be made available for the haling of embedded content, e.g. with a default option that can be overridden by a user (e.g., administrator) with appropriate privileges.

At step 416, replacement content is generated within the isolated execution environment, and served to the non-isolated application instance in place of the requested content. The requested content never leaves the isolated execution environment in its original form. As indicated, the replacement content may be an image of the requested content rendered in the isolated execution environment, or a modified version of the requested content (e.g., modified by removing one or more pieces of script).

At step 418, the replacement content is rendered in the non-isolated application instance.

If the content resource is assigned an unrestricted status at step 408, the method proceeds to step 422.

At step 422, the content request is used to obtain the requested content, in the same way as step 412.

However, because the content resource is trusted in this case, at step 424, the requested content is simply passed to the non-isolated application instance, and rendered by the non-isolated application instance at step 426.

If the content resource is assigned a blocked status at step 408, the method proceeds to step 428. In this case, the network proxy agent serves a predetermined error page to the non-isolated application instance, which is rendered by the non-isolated application at step 430. The requested content is not obtained in this case.

Figure 5:
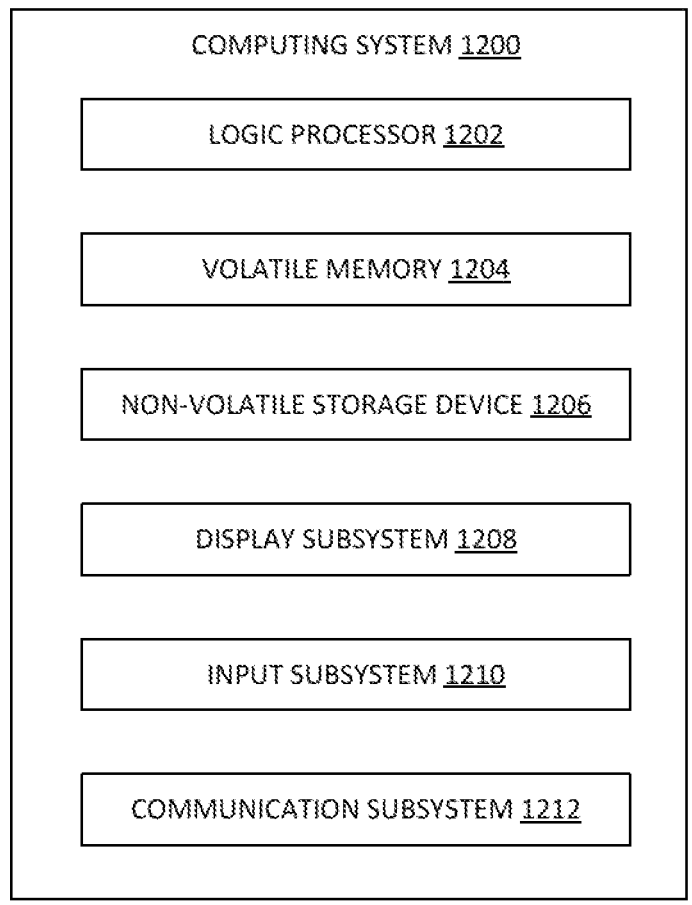
FIG. 5 shows a schematic block diagram of a computer device.

FIG. 5 schematically shows a non-limiting example of a computer device 1200 that can enact one or more of the methods or processes described above. computer device 1200 is shown in simplified form. Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 10. Logic processor 1202 comprises one or more physical (hardware) processors configured to carry out processing operations. For example, the logic processor 1202 may be configured to execute instructions that are part of one or more applications, programs, routines, libraries, objects, components, data structures, or other logical constructs. The logic processor 1202 may include one or more hardware processors configured to execute software instructions based on an instruction set architecture, such as a central processing unit (CPU), graphical processing unit (GPU) or other form of accelerator processor. Additionally or alternatively, the logic processor 1202 may include a hardware processor(s)) in the form of a logic circuit or firmware device configured to execute hardware-implemented logic (programmable or non-programmable) or firmware instructions. Processor(s) of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 1202 may be virtualized and executed by remotely accessible, networked computing devices configured in a cloud-computing configuration. In such a case, these virtualized aspects are run on different physical logic processors of various different machines. Non-volatile storage device 1206 includes one or more physical devices configured to hold instructions executable by the logic processor 1202 to implement the methods and processes described herein. When such methods and processes are implemented, the state of non-volatile storage device 1206 may be transformed—e.g., to hold different data. Non-volatile storage device 1206 may include physical devices that are removable and/or built-in. Non-volatile storage device 1206 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 1206 may include non-volatile, dynamic, static, read/write, read-only, sequential-access, location-addressable, file-addressable, and/or content-addressable devices. Volatile memory 1204 may include one or more physical devices that include random access memory. Volatile memory 1204 is typically utilized by logic processor 1202 to temporarily store information during processing of software instructions. Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computer device 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices. When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer device 1200 to send and/or receive messages to and/or from other devices via a network such as the internet. The term computer readable media as used herein may include computer storage media. Computer storage media may include volatile and non-volatile, removable and nonremovable media (e.g., volatile memory 1204 or non-volatile storage 1206) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by. the computer device 1200. Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

In one aspect herein, a computer device comprises: a network interface configured to connect to a computer network; a memory configured to store computer readable instructions embodying a network proxy agent; and a processor coupled to the memory and the network interface, and configured to execute an instance of the network proxy agent within an isolated execution environment of the processor, resulting in network traffic exchanged between an application instance operable to run outside of the isolated execution environment and the computer network being routed through the instance of the local network proxy agent that is configured to: receive from the application instance in the network traffic a first request for first requested content served from a first requested content resource; assign a restricted status to the first requested content resource based on a content access policy applied to the first requested content resource; obtain the first requested content from the first requested content resource; responsive to assigning the restricted status to the first requested content resource, generate replacement content based on the first requested content; and output the replacement content to the application instance.

In another aspect herein, a computer device comprises: a network interface; a memory configured to store computer readable instructions; and a processor coupled to the memory and the network interface, and configured to execute the computer-readable instructions, the computer-readable instructions being configured, upon execution by the processor, to cause the processor to: receive in an isolated execution environment, from an application instance outside of the isolated execution environment, a first request comprising a first content resource identifier; determine based on a content access policy a restricted status of the first content resource identifier; obtain in the isolated execution environment via the network interface first requested content using the first content resource identifier; responsive to determining the restricted status of the first content resource identifier, generate in the isolated execution environment replacement content based on the first requested content; and output the replacement content to the application instance.

The computer-readable instructions may be configured to cause the processor to render the first requested content within the isolated execution environment, and generate the replacement content based on rendering the first requested content.

The replacement content may comprise an image of the first requested content as rendered within the isolated execution environment.

The computer-readable instructions may be configured to cause the processor to: receive, from the application instance, an indication of a selected image location within the image, determine, based on the indication of the selected image location, a corresponding action defined in the first requested content, and perform the corresponding action within the isolated execution environment.

The restricted status of the first content resource identifier may be determined based on the content access policy applied to first resource metadata about the first content resource identifier.

The first resource metadata may comprise at least one of: a domain with which the first content resource identifier is associated, and a content resource type associated the first content resource identifier.

The first requested content may be obtained responsive to associating the restricted status with the first content resource identifier.

The computer-readable instructions may be configured to cause the processor to: receive from the application instance a second request comprising a second content resource identifier; determine based on the content access policy an unrestricted status of the second content resource identifier; obtain in the isolated execution environment via the network interface second requested content using the second content resource identifier; and responsive to determining the unrestricted status of the second content resource identifier, output the second requested content from the isolated execution environment to the application instance outside of the isolated execution environment.

The unrestricted status of the second requested content resource may be determined based on the content access policy applied to second resource metadata about the second requested content resource.

The computer-readable instructions may be configured to cause the processor to: receive from the application instance a third request comprising a third content resource identifier; determine based on the content access policy a blocked status of the third content resource identifier; and output to the to the application instance an indication that the third request is blocked.

The isolated execution environment may be a sandbox or virtual machine.

The first request may be received from a remote device on which the application instance is executed.

The application instance may be a first web browser instance operable to run outside of the isolated execution environment.

The computer-readable instructions may be configured to cause the processor to execute within the isolated execution environment a second web browser instance configured to receive the first request and determine the restricted status.

The computer-readable instructions may be configured to cause the processor to obtain the content access policy from a policy service using a user authentication token.

The computer-readable instructions may be configured to cause the processor to: receive from the application instance an indication of an action pertaining to the first content; and reject the action based on a session policy applied to the first requested content.

Further aspects herein provide a computer system configured to implement the method of any preceding aspect or embodiment, and a computer program for programming a computer system to implement the same.

A further aspect herein provides a computer-readable storage medium storing computer-readable instructions configured, upon execution by a processor, to cause the processor to: generate a sandbox environment; receive from an application outside of the sandbox environment a first content request comprising a first content identifier; determine based on a content access policy a restricted status of the first content request; obtain in the sandbox environment, from a first content resource outside of the sandbox environment, first content using the first content identifier; responsive to determining the restricted status of the first content request, generate replacement content based on the first content; and output the replacement content from the sandbox environment to the application outside of the sandbox environment.

The computer-readable instructions may be configured to cause the processor to: receive from the application a second content request comprising a second content identifier; determine based on the content access policy an unrestricted status of the second content request; obtain in the sandbox environment, from a second content resource outside of the sandbox environment, second content using the second content identifier; and responsive to determining the unrestricted status of the second content request, output the second content from the sandbox environment to the application outside of the sandbox environment.

A further aspect herein provides a computer-implemented method comprising: receiving from an application, at a virtual machine isolated from the application, a first content request comprising a first content identifier; determining based on a content access policy a restricted status of the first content request; obtaining in the virtual machine, from a first content resource external to the virtual machine, first content using the first content identifier; responsive to determining the restricted status of the first content request, generating replacement content based on the first content; and outputting the replacement content from the virtual machine to the application.

The method may comprise receiving at the virtual machine from the application a second content request comprising a second content identifier; determine based on the content access policy an unrestricted status of the second content request; obtaining in the virtual machine, from a second content resource external to the virtual machine, second content using the second content identifier; and responsive to determining the unrestricted status of the second content request, outputting the second content from the virtual machine to the application.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer device comprising:
a network interface;
a memory configured to store computer readable instructions; and
a processor coupled to the memory and the network interface, and configured to execute the computer-readable instructions, the computer-readable instructions being configured, upon execution by the processor, to cause the processor to:
receive in an isolated execution environment, from an application instance outside of the isolated execution environment, a first request comprising a first content resource identifier;
determine based on a content access policy a restricted status of the first content resource identifier;
obtain in the isolated execution environment via the network interface first requested content using the first content resource identifier;
responsive to determining the restricted status of the first content resource identifier, generate in the isolated execution environment replacement content based on the first requested content;
output the replacement content to the application instance;
receive from the application instance a second request comprising a second content resource identifier;
determine based on the content access policy an unrestricted status of the second content resource identifier;
obtain in the isolated execution environment via the network interface second requested content using the second content resource identifier; and
responsive to determining the unrestricted status of the second content resource identifier, output the second requested content from the isolated execution environment to the application instance outside of the isolated execution environment.

2. The computer device of claim 1, wherein the computer-readable instructions are configured to cause the processor to render the first requested content within the isolated execution environment, and generate the replacement content based on rendering the first requested content.

3. The computer device of claim 1, wherein the replacement content comprises an image of the first requested content as rendered within the isolated execution environment.

4. The computer device of claim 3, wherein the computer-readable instructions are configured to cause the processor to:
receive, from the application instance, an indication of a selected image location within the image,
determine, based on the indication of the selected image location, a corresponding action defined in the first requested content, and
perform the corresponding action within the isolated execution environment.

5. The computer device of claim 1, wherein the restricted status of the first content resource identifier is determined based on the content access policy applied to first resource metadata about the first content resource identifier.

6. The computer device of claim 1, wherein the first resource metadata comprises at least one of:
a domain with which the first content resource identifier is associated, and
a content resource type associated the first content resource identifier.

7. The computer device of claim 1, wherein the first requested content is obtained responsive to associating the restricted status with the first content resource identifier.

8. The computer device of claim 1, wherein the unrestricted status of the second requested content resource is determined based on the content access policy applied to second resource metadata about the second requested content resource.

9. The computer device of claim 1, wherein the computer-readable instructions are configured to cause the processor to:
receive from the application instance a third request comprising a third content resource identifier;
determine based on the content access policy a blocked status of the third content resource identifier; and output to the to the application instance an indication that the third request is blocked.

10. The computer device of claim 1, wherein the isolated execution environment is a sandbox or virtual machine.

11. The computer device of claim 1, wherein the first request is received from a remote device on which the application instance is executed.

12. The computer device of claim 1, wherein the application instance is a first web browser instance operable to run outside of the isolated execution environment.

13. The computer device of claim 12, wherein the computer-readable instructions are configured to cause the processor to execute within the isolated execution environment a second web browser instance configured to receive the first request and determine the restricted status.

14. The computer device according to claim 1, wherein the computer-readable instructions are configured to cause the processor to obtain the content access policy from a policy service using a user authentication token.

15. The computer device of claim 1, wherein the computer-readable instructions are configured to cause the processor to:
   receive from the application instance an indication of an action pertaining to the first content; and
   reject the action based on a session policy applied to the first requested content.

16. The computer device of claim 1, wherein the replacement content comprises a modified version of the first requested content modified having a piece of script removed.

17. A computer-readable memory storing computer-readable instructions configured, upon execution by a processor, to cause the processor to:
   generate a sandbox environment;
   receive from an application outside of the sandbox environment a first content request comprising a first content identifier;
   determine based on a content access policy a restricted status of the first content request;
   obtain in the sandbox environment, from a first content resource outside of the sandbox environment, first content using the first content identifier;
   responsive to determining the restricted status of the first content request, generate replacement content based on the first content;
   output the replacement content from the sandbox environment to the application outside of the sandbox environment;
   receive from the application a second content request comprising a second content identifier;
   determine based on the content access policy an unrestricted status of the second content request;
   obtain in the sandbox environment, from a second content resource outside of the sandbox environment, second content using the second content identifier; and
   responsive to determining the unrestricted status of the second content request, output the second content from the sandbox environment to the application outside of the sandbox environment.

18. The computer-readable memory of claim 17, wherein the replacement content comprises a modified version of the first requested content modified having a piece of script removed.

19. A computer-implemented method comprising:
   receiving from an application, at a virtual machine isolated from the application, a first content request comprising a first content identifier;
   determining based on a content access policy a restricted status of the first content request;
   obtaining in the virtual machine, from a first content resource external to the virtual machine, first content using the first content identifier;
   responsive to determining the restricted status of the first content request, generating replacement content based on the first content;
   outputting the replacement content from the virtual machine to the application;
   receiving at the virtual machine from the application a second content request comprising a second content identifier;
   determine based on the content access policy an unrestricted status of the second content request;
   obtaining in the virtual machine, from a second content resource external to the virtual machine, second content using the second content identifier; and
   responsive to determining the unrestricted status of the second content request, outputting the second content from the virtual machine to the application.

20. The computer-implemented method of claim 19, wherein the replacement content comprises a modified version of the first requested content modified having a piece of script removed.

* * * * *